(12) United States Patent
Maruichi et al.

(10) Patent No.: US 9,028,933 B2
(45) Date of Patent: May 12, 2015

(54) SHRINK LABELS

(75) Inventors: Naoyuki Maruichi, Shiga (JP);
Takanori Nozaki, Shiga (JP); Akira Morikawa, Shiga (JP)

(73) Assignee: Gunze Limited, Kyoto (JP)

( * ) Notice: Subject to any disclaimer, the term of this patent is extended or adjusted under 35 U.S.C. 154(b) by 1330 days.

(21) Appl. No.: 11/918,915

(22) PCT Filed: Feb. 16, 2006

(86) PCT No.: PCT/JP2006/302723
§ 371 (c)(1),
(2), (4) Date: Jan. 21, 2009

(87) PCT Pub. No.: WO2006/114931
PCT Pub. Date: Nov. 2, 2006

(65) Prior Publication Data
US 2009/0280341 A1 Nov. 12, 2009

(30) Foreign Application Priority Data

Apr. 20, 2005 (JP) .................. 2005-122943
Apr. 20, 2005 (JP) .................. 2005-122944
Nov. 4, 2005 (JP) .................. 2005-321237
Nov. 10, 2005 (JP) .................. 2005-326000
Jan. 10, 2006 (JP) .................. 2006-002772

(51) Int. Cl.
B32B 27/08 (2006.01)
B32B 27/30 (2006.01)
(Continued)

(52) U.S. Cl.
CPC ............... G09F 3/04 (2013.01); B32B 2250/40 (2013.01); B32B 2325/00 (2013.01); B32B 27/302 (2013.01); B32B 2307/736 (2013.01);
(Continued)

(58) Field of Classification Search
None
See application file for complete search history.

(56) References Cited

U.S. PATENT DOCUMENTS 4,332,858 A * 6/1982 Saitoh et al. .................. 428/412
5,859,116 A * 1/1999 Shih .............................. 524/493
(Continued)

FOREIGN PATENT DOCUMENTS

EP    1 752 285 A1    2/2007
JP    61-041543    *    2/1986
(Continued)

OTHER PUBLICATIONS

International Search Report from Corresponding International Application No. PCT/JP2006/302723, dated May 23, 2006, 4 pages.
(Continued)

*Primary Examiner* — Vivian Chen
(74) *Attorney, Agent, or Firm* — Brinks Gilson & Lione

(57) ABSTRACT

The present invention is a shrink label, comprising a heat-shrinkable multilayer resin film comprising an intermediate layer comprising a polystyrene type resin and outer surface layers comprising a polyester type resin, with said intermediate layer interposed therebetween, as a base film, wherein the polystyrene type resin composing said intermediate layer is an aromatic vinyl hydrocarbon-conjugated diene copolymer, and said intermediate layer is bonded to said outer surface layers with an adhesive layer comprising a hydrogen addition product of an aromatic vinyl hydrocarbon-conjugated diene copolymer, having at least one functional group selected from the group consisting of a carboxylic group, an acid anhydride group, an amino group, an epoxy group and a hydroxyl group in a molecule.

3 Claims, 2 Drawing Sheets

(51) Int. Cl.
| | |
|---|---|
| B32B 27/36 | (2006.01) |
| C08L 25/08 | (2006.01) |
| C08L 25/10 | (2006.01) |
| C08L 25/14 | (2006.01) |
| C08L 33/00 | (2006.01) |
| C08L 33/06 | (2006.01) |
| C08G 63/183 | (2006.01) |
| C08G 63/199 | (2006.01) |
| C08G 63/137 | (2006.01) |
| C09J 125/04 | (2006.01) |
| C09J 125/08 | (2006.01) |
| C09J 125/10 | (2006.01) |
| C09J 125/14 | (2006.01) |
| C09J 133/00 | (2006.01) |
| B32B 7/12 | (2006.01) |
| G09F 3/04 | (2006.01) |
| B32B 27/18 | (2006.01) |
| B32B 27/28 | (2006.01) |
| C09J 133/06 | (2006.01) |

(52) U.S. Cl.
CPC ........... *B32B2333/04* (2013.01); *B32B 27/308* (2013.01); *B32B 2250/05* (2013.01); *C08L 33/00* (2013.01); *C08L 33/06* (2013.01); *C08L 25/10* (2013.01); *C08L 25/14* (2013.01); *C08L 25/08* (2013.01); *C08G 63/199* (2013.01); *C08G 63/137* (2013.01); *C08G 63/183* (2013.01); *C09J 125/04* (2013.01); *C09J 133/06* (2013.01); *C09J 133/00* (2013.01); *C09J 125/08* (2013.01); *C09J 125/10* (2013.01); *C09J 125/14* (2013.01); *B32B 7/12* (2013.01); *B32B 27/18* (2013.01); *B32B 27/28* (2013.01); *B32B 27/36* (2013.01)

(56) References Cited

U.S. PATENT DOCUMENTS

| | | | |
|---|---|---|---|
| 6,184,289 B1 * | 2/2001 | Teranishi et al. | 525/95 |
| 6,214,476 B1 * | 4/2001 | Ikeda et al. | 428/476.9 |
| 6,270,866 B1 * | 8/2001 | Okuda et al. | 428/35.1 |
| 6,627,273 B2 * | 9/2003 | Wolf et al. | 428/34.9 |
| 2008/0026170 A1 * | 1/2008 | Yamada et al. | 428/34.9 |
| 2009/0202851 A1 * | 8/2009 | Maruichi et al. | 428/483 |

FOREIGN PATENT DOCUMENTS

| | | | |
|---|---|---|---|
| JP | 61-41543 A | | 2/1986 |
| JP | 61-116543 A | | 6/1986 |
| JP | 07-082387 | * | 3/1995 |
| JP | 07-137212 | * | 5/1995 |
| JP | 7-137212 A | | 5/1995 |
| JP | 2001-191461 | * | 7/2001 |
| JP | 2001-323082 A | | 11/2001 |
| JP | 2002-326324 | * | 11/2002 |
| JP | 2002-326324 A | | 11/2002 |
| JP | 2002-331581 | * | 11/2002 |
| JP | 2002-331581 A | | 11/2002 |
| JP | 2002-351332 | * | 12/2002 |
| JP | 2002-351332 A | | 12/2002 |
| JP | 2003-277705 | * | 10/2003 |
| JP | 2003-277705 A | | 10/2003 |
| JP | 2006-015745 | * | 1/2006 |
| JP | 2006-15745 A | | 1/2006 |
| JP | 2006-044179 | | 2/2006 |
| JP | 2006-44179 A | | 2/2006 |
| WO | WO 99/29490 | | 6/1999 |
| WO | WO 01/68785 | * | 9/2001 |
| WO | WO 01/68785 A1 | | 9/2001 |
| WO | WO 2005/118288 A1 | | 12/2005 |

OTHER PUBLICATIONS

Full Translation of the Office Action for JP Application No. 2005-321237, in the JPO, dated Apr. 13, 2010.
Full Translation of the Office Action for JP Application No. 2005-326000, in the JPO, dated Apr. 13, 2010.
Extended European Search Report for EP Application No. 06713864.4, dated Oct. 1, 2010, 6 pages.
Abstract No. XP 002601608 of JP 2002-351332, 2 pages.
Office Action for JP Application No. 2005-321237, dated Apr. 6, 2010, 4 pages.
Office Action for JP Application No. 2005-326000, dated Apr. 6, 2010, 4 pages.
http://www.akelastomer.com/jpn/eel/pub/products/tuftec/tuftec_m1943.html, 2 pages.
http://www.akelastomer.com/jpn/eel/pub/products/tuftec/tuftec_m1913.html, 2 pages.

* cited by examiner

SHRINK LABELS

RELATED APPLICATIONS

This application is a nationalization of PCT application PCT/JP 2006/302723 filed on Feb. 16, 2006, claiming priority on Japanese Application No. 2005-122943filed on Apr. 20, 2005; Japanese Application No. 2005-122944 filed on Apr. 20, 2005; Japanese Application No. 2005-321237filed on Nov. 4, 2005; Japanese Application No. 2005-326000 filed on Nov. 10, 2005; Japanese Application No. 2006-002772filed on Jan. 10, 2006; the contents of which are incorporated herein by reference in their entirety.

TECHNICAL FIELD

The present invention relates to a shrink label comprising a multilayer film, which is superior in low temperature resistance, heat resistance, oil resistance, tearing properties along the perforation and appearance and does not peel in covering a container, as a base film, and a heat-shrinkable multilayer resin film which can effectively prevent the deterioration of the content of a container due to ultraviolet light and is superior in the tearing properties along the perforation and the oil resistance when the heat-shrinkable multilayer resin film is used as a shrink label for a container, and a shrink label comprising the heat-shrinkable multilayer resin film as a base film.

BACKGROUND ART

In recent years, many containers such as PET bottles and metal cans are covered with shrink labels prepared by performing printing on a base film of a heat-shrinkable resin film.

As the shrink label, labels comprising polystyrene type resin predominate since it is superior in low temperature shrinkability. However, since the polystyrene type resin film has inadequate heat resistance, there was a problem that for example, the shrink label may be shrunk and the label may be distorted or broken when a PET bottle topples in being heated in a hot warmer equipped in a convenience store, and the like. Furthermore, the polystyrene type resin film also has a problem that since it has inadequate solvent resistance, it may be shrunk or dissolved by the adhesion of oils when it is used for the packaging of articles containing oils.

On the other hand, efforts to use a polyester type film, which is superior in low temperature resistance, heat resistance and solvent resistance, in place of a polystyrene type resin film as a shrink label are made. But, the polyester type film has a problem that it tends to produce crinkles when it covers a container since it has bad low temperature shrinkability and is shrunk rapidly. Further, perforation for tearing off is often provided on the shrink film so that the shrink label can be easily torn off and removed from the used container in order to recycle containers, but in the polyester type film, there was also a problem that tearing properties along the perforation are poor, and therefore the shrink label cannot be easily torn off and removed from the container.

For this situation, in Patent Document 1, a hard multilayer shrinkable film obtainable by laminating outer surface layers comprising a polyester type resin on an intermediate layer comprising a polystyrene type resin with an adhesive layer comprising an olefin type resin interposed between the outer surface layer and the intermediate layer, is disclosed. Further, in Patent Document 2, a shrink label, which includes a base film obtainable by laminating outer surface layers comprising a polyester type resin comprising a specific monomer on both sides of an intermediate layer comprising a polystyrene type resin, and by laminating the outer surface layers on the intermediate layer without an adhesive layer interposed between the outer surface layer and the intermediate layer, is disclosed. The shrink labels comprising these multilayer films are superior in low temperature shrinkability and tearing properties along the perforation by the virtue of the intermediate layer comprising a polystyrene type resin, and further they are also superior in solvent resistance, low temperature resistance and heat resistance since the intermediate layer is covered with the outer surface layers comprising a polyester type resin. However, if these shrink labels cover the containers actually, there were problems that in the hard multilayer shrinkable film described in Patent Document 1, the intermediate layer may be peeled off from the outer surface layer in covering the container, and in the shrink label described in Patent Document 2, after covering the container with the shrink label, if the films rub against each other or the film is scratched with a fingernail or a body during transportation of products, peeling may occur between an intermediate layer and an outer surface layer.

Additionally, in recent years, when a shrink label formed by performing printing on a base film of the heat-shrinkable resin film covers a plastic container such as a PET bottle, it is seen as a problem that the contents of a container are deteriorated and a storage property becomes worse due to ultraviolet light emitted from solar light or a fluorescent lamp compared with the storage by a metal can. For example, chlorophyll contained in an edible oil and the like is decomposed at a wavelength of 300 nm or shorter and causes quality deterioration. Furthermore, citral used as an aromatic of beverage and the like changes to a component having unfavorable fragrance by light with a wavelength of 300 to 350 nm. Further, amino acids such as tryptophan and thyrosin contained in sake are discolored by light with a wavelength of 320 to 380 nm. For this reasons, in recent years, shrink films having an ultraviolet light blocking property to prevent the deterioration/change of savor and taste and discoloration/fading of the contents of the containers due to ultraviolet light are in practical use.

As such a shrink label, labels comprising polystyrene type resin predominate since it is superior in low temperature shrinkability, and for example, in Patent Document 3, an ultraviolet light absorbent polystyrene type resin heat-shrinkable film, which is a polystyrene type resin film having a three-layer structure, and has a larger amount of an ultraviolet absorber mixed in the intermediate layer than in both outer layers, is disclosed.

However, the heat-shrinkable polystyrene type film having such a constitution had a problem that the film cannot adequately absorb light with a wavelength of 400 nm or shorter if the ultraviolet absorber is not added in a large amount. Further, it had problem that the ultraviolet absorber is bled out and this film becomes economically disadvantageous when the ultraviolet absorber is added in a large amount. Further, the polystyrene type film also has a problem that since it has inadequate oil resistance, it may be shrunk or dissolved by the adhesion of oils when a label of polystyrene type film covers a container of contents containing oils.

On the other hand, efforts to use a heat-shrinkable polyester type film formed by adding an ultraviolet absorber to the polyester type film, which is superior in low temperature resistance, solvent resistance and oil resistance, in place of the polystyrene type resin film as a shrink label are made, and for example, in Patent Document 4, a polyester type resin film, which realizes excellent ultraviolet light blocking properties and heat-shrinkability by a method of adding an ultraviolet absorber to the heat-shrinkable polyester type film, or by a method of adding an ultraviolet absorber to an inner layer formed by laminating polyester type films by two or more layers, is disclosed.

However, since the polyester type films have a high molding temperature, in the case of extrusion molding the polyester type resin, the sublimation and evaporation of the ultraviolet absorber from a die leads to a hostile working environment and causes the contamination of a roll to take off a film extruded from the die to deteriorate productivity. If the molding temperature is lowered to prevent the thermal deterioration of the ultraviolet absorber, the productivity of the film is significantly deteriorated. Furthermore, in the polyester type film, there is also a problem that tearing properties along the perforation are poor, and therefore the shrink label cannot be easily torn off and removed from the container.

Accordingly, a heat-shrinkable multilayer resin film having an excellent ultraviolet light blocking property and an excellent tearing property along the perforation without leading to the hostile working environment and causing reduction in the productivity has be needed.

Patent Document 1: Japanese Kokai Publication Sho-61-41543
Patent Document 2: Japanese Kokai Publication 2002-351332
Patent Document 3: Japanese Kokai Publication 2002-326324
Patent Document 4: Japanese Kokai Publication 2001-323082

DISCLOSURE OF THE INVENTION

Problems to be Solved by the Invention

In view of the above state of the art, it is an object of the present invention to provide a shrink label comprising a multilayer film, which is superior in low temperature resistance, heat resistance, oil resistance, tearing properties along the perforation and appearance and does not peel in covering a container, as a base film, and a heat-shrinkable multilayer resin film which can effectively prevent the deterioration of the content of a container due to ultraviolet light and is superior in the tearing properties along the perforation and the oil resistance when the heat-shrinkable multilayer resin film is used as a shrink label for a container, and a shrink label comprising the heat-shrinkable multilayer resin film as a base film.

Means for Solving the Problems

A shrink label of a first aspect of the present invention is a shrink label, comprising a heat-shrinkable multilayer resin film comprising an intermediate layer comprising a polystyrene type resin and outer surface layers comprising a polyester type resin, with said intermediate layer interposed therebetween, as a base film, wherein the polystyrene type resin composing said intermediate layer is an aromatic vinyl hydrocarbon-conjugated diene copolymer, and said intermediate layer is bonded to said outer surface layers with an adhesive layer comprising a hydrogen addition product of an aromatic vinyl hydrocarbon-conjugated diene copolymer, having at least one functional group selected from the group consisting of a carboxylic group, an acid anhydride group, an amino group, an epoxy group and a hydroxyl group in a molecule.

A shrink label of a second aspect of the present invention is a shrink label, comprising a heat-shrinkable multilayer resin film comprising an intermediate layer comprising a polystyrene type resin and outer surface layers comprising a polyester type resin, with said intermediate layer interposed therebetween, as a base film,
wherein the polystyrene type resin composing said intermediate layer is a mixed resin of an aromatic vinyl hydrocarbon-conjugated diene copolymer and an aromatic vinyl hydrocarbon-aliphatic unsaturated carboxylic acid ester copolymer, and
said intermediate layer is bonded to said outer surface layers with an adhesive layer comprising a hydrogen addition product of an aromatic vinyl hydrocarbon-conjugated diene copolymer, having at least one functional group selected from the group consisting of a carboxylic group, an acid anhydride group, an amino group, an epoxy group and a hydroxyl group in a molecule.

The heat-shrinkable multilayer resin film of the present invention is a heat-shrinkable multilayer resin film, comprising an intermediate layer comprising a polystyrene type resin and outer surface layers comprising a polyester type resin, with said intermediate layer interposed therebetween, wherein said intermediate layer contains an ultraviolet absorber.

Hereinafter, the present invention will be described in detail.

The shrink label of the first aspect of the present invention is a shrink label, comprising a heat-shrinkable multilayer resin film comprising an intermediate layer comprising a polystyrene type resin and outer surface layers comprising a polyester type resin, with said intermediate layer interposed therebetween, as a base film, wherein the polystyrene type resin composing said intermediate layer is an aromatic vinyl hydrocarbon-conjugated diene copolymer, and said intermediate layer is bonded to said outer surface layers with an adhesive layer comprising a hydrogen addition product of an aromatic vinyl hydrocarbon-conjugated diene copolymer, having at least one functional group selected from the group consisting of a carboxylic group, an acid anhydride group, an amino group, an epoxy group and a hydroxyl group in a molecule.

The present inventors found that in the shrink label comprising a heat-shrinkable multilayer resin film comprising an intermediate layer comprising an aromatic vinyl hydrocarbon-conjugated diene copolymer being a polystyrene type resin and outer surface layers comprising a polyester type resin, with the intermediate layer interposed therebetween, as a base film, when the intermediate layer is bonded to the outer surface layers with a specific adhesive layer therebetween, the shrink label can cover containers stably without producing delamination, and these findings have now led to completion of the shrink label of the first aspect of the present invention.

As a method of covering the container with the shrink label, generally, a method, in which a shrink film is bonded along both edges with a solvent to process the shrink film into a tubular form (center seal processing) and then the film is heated with the container covered with the film to shrink the film, is adopted.

FIG. 1 is a schematic view showing the states of and around a center seal portion in succession of covering steps in employing the shrink label of the first aspect of the present invention. FIG. 2 and FIG. 3 are schematic views showing the states of and around the center seal portion in succession of covering steps in employing conventional shrink labels comprising a multilayer film as a base film.

The present inventors investigated the conditions of covering defects in the case of using conventional shrink labels comprising multilayer films as a base film, and consequently they found that in the shrink label described in Patent Document 2, after center sealing and then a film is shrunk by heat, if the films rub against each other or the film is scratched with a fingernail or a body during transportation of products, peeling occurs between an intermediate layer 1 and an outer surface layer 2, as shown in FIG. 2 (for convenience of comparison, in FIG. 2, peeling occurs at a film edge, but in actual, peeling can occur not only at the film edge but also in a central portion). Further, they found that in the shrink label described in Patent Document 1, after center sealing, peeling occurs between the outer surface layer 2 and an adhesive layer 3' on the center seal side when the film is shrunk by heat, as shown in FIG. 3.

In the shrink label described in Patent Document 2, the outer surface layers 2 are laminated directly on the intermediate layer 1 without the adhesive layer interposed between the outer surface layer and the intermediate layer. In Patent Document 2, it is thought that by using an outer surface layer comprising a polyester type resin comprising a specific monomer, an affinity of the outer surface layer 2 and the intermediate layer 1 is enhanced to increase adhesion strength, but it is thought that in practice, the adhesion strength between these layers is not high, and peeling has occurred between the intermediate layer 1 and the outer surface layer 2.

On the other hand, in the shrink label described in Patent Document 1, since the outer surface layers 2 are laminated on the intermediate layer 1 with an adhesive layer 3' formed from an olefin type resin interposed between the outer surface layer and the intermediate layer, the adhesion strength between these layers is supposed to be high. In center seal methods, the shrink film is bonded along both edges with a solvent. In this case, as the solvent, a solvent which dissolves the polyester type resin used in the outer surface layer is used, and a part of the outer surface layer is dissolved with the solvent to bond the edges of the film. An olefin type resin used as an adhesive layer in Patent Document 1 has extremely high solvent resistance against a solvent which dissolves polyester type resins and is hardly dissolved in or swelled with a solvent. Therefore, it is thought that even when a part of the outer surface layer is dissolved at the time of center sealing, the solvent does not permeate into the shrink label, and an adhesive force between the dissolved outer surface layer and the inner adhesive layer is decreased, and peeling has occurred between the outer surface layer 1 and the adhesive layer 3' when stress is applied during heat-shrinkage.

On the contrary, in the shrink label of the first aspect of the present invention, the delamination did not occur even in heat-shrinking the shrink label after center sealing as shown in FIG. 1.

In the shrink label of the first aspect of the present invention, since the outer surface layers 2 are laminated on the intermediate layer 1 with the adhesive layer 3 comprising a hydrogen addition product of an aromatic vinyl hydrocarbon-conjugated diene copolymer, having at least one functional group selected from the group consisting of a carboxylic group, an acid anhydride group, an amino group, an epoxy group and a hydroxyl group in a molecule interposed between the outer surface layer and the intermediate layer, the adhesion strength between these layers is extremely high. Further, since the resin composing this adhesive layer 3 is dissolved in or swelled with a solvent which dissolves polyester type resins, the solvent can permeate into the shrink label at the time of center sealing, and the adhesion is performed as a whole. Therefore, an adhesive force between the layers is improved more at the center seal portion, and the delamination is assumed not to occur.

The shrink label of the first aspect of the present invention comprising a heat-shrinkable multilayer resin film comprising an intermediate layer comprising a polystyrene type resin and outer surface layers comprising a polyester type resin, with the intermediate layer interposed therebetween, as a base film.

The polystyrene type resin composing the intermediate layer is an aromatic vinyl hydrocarbon-conjugated diene copolymer. Since the aromatic vinyl hydrocarbon-conjugated diene copolymer has excellent low temperature shrinkability, the resulting shrink film can easily cover the container without producing crinkles and the like. Additionally, the resulting shrink film will have excellent tearing properties along the perforation.

The aromatic vinyl hydrocarbon-conjugated diene copolymer is not particularly limited, and examples of the aromatic vinyl hydrocarbon include styrene, o-methylstyrene, p-methylstyrene, and examples of the conjugated diene include 1,3-butadiene, 2-methyl-1,3-butadiene, 2,3-dimethyl-1,3-butadiene, 1,3-pentadiene, 1,3-hexadiene. These copolymers may be used singly or in combination of two or more species. Among these, a styrene-butadiene-styrene copolymer (SBS resin) is suitable since this copolymer is superior particularly in low temperature shrinkability and tearing properties along the perforation. Further, in order to prepare a film with less-fish eye, it is preferred to use a styrene-isoprene-styrene copolymer (SIS resin), a styrene-isoprene-butadiene-styrene copolymer (SIBS resin), and the like, in which 2-methyl-1,3-butadiene(isoprene) is used as conjugated diene.

When the SBS resin, the SIS resin, or the SIBS resin is used as the aromatic vinyl hydrocarbon-conjugated diene copolymer, one species of resin may be used singly, or a plurality of resins may be used in combination. When a plurality of resins are used, resins may be dry-blended, or may be used as a compounded resin formed by extruding the resins in a specific composition with an extruder to knead the resins and pelletizing the extruded resin. When such resins are used singly or plurally, the composition preferably has a styrene content of 65 to 90% by weight and a conjugated diene content of 10 to 35% by weight. Resins having such a composition are superior particularly in low temperature shrinkability and tearing properties along the perforation. On the other hand, when the conjugated diene content is less than 10% by weight, the film tends to tear when tension is applied, and the film may break contingently in converting printing or using the film as a label. When the conjugated diene content is more than 35% by weight, extraneous substances such as gel may become apt to be produced in molding processing the film.

The polyester type resin composing the outer surface layers can be prepared by polycondensating dicarboxylic acid with diol.

The dicarboxylic acid is not particularly limited, and examples of the dicarboxylic acid include o-phthalic acid, terephthalic acid, isophthalic acid, succinic acid, adipic acid, sebacic acid, azelaic acid, octylsuccinic acid, cyclohexanedicarboxylic acid, naphthalenedicarboxylic acid, fumaric acid, maleic acid, itaconic acid, and decamethylenecarboxylic acid, and anhydrides and lower alkyl esters thereof.

The diol is not particularly limited, and examples of the diol include aliphatic diols such as ethylene glycol, 1,3-propanediol, 1,4-butanediol, diethylene glycol, 1,5-pentanediol, 1,6-hexanediol, dipropylene glycol, triethylene glycol, tetraethylene glycol, 1,2-propanediol, 1,3-butanediol, 2,3-butanediol, neopentyl glycol(2,2-dimethylpropane-1,3-diol), 1,2-hexanediol, 2,5-hexanediol, 2-methyl-2,4-pentanediol, 3-methyl-1,3-pentanediol, and 2-ethyl-1,3-hexanediol; and alicyclic diols such as 2,2-bis(4-hydroxycyclohexyl)propane, alkylene oxide addition product of 2,2-bis(4-hydroxycyclohexyl)propane, 1,4-cyclohexanediol, and 1,4-cyclohexanedimethanol; and the like.

As the polyester type resin, in particular, substances, which contain a component derived from terephthalic acid as a dicarboxylic acid component and a component derived from ethylene glycol and 1,4-cyclohexanedimethanol as a diol component, are suitable. By using such polyester type resins, it is possible to impart particularly high heat resistance and solvent resistance to the resulting shrink label of the first aspect of the present invention.

Further, when particularly high heat resistance and solvent resistance are imparted, substances having a content of an ethylene glycol-derived component of 60 to 80% by mole and a content of a 1,4-cyclohexanedimethanol-derived component of 10 to 40% by mole are preferably used. These polyester type resins may further contain 0 to 20% by mole of a diethylene glycol-derived component.

As the polyester type resin composing the outer surface layers, polyester type resins having the composition described above may be used singly, or polyester type resins having the composition described above may be used in combination of two or more species.

As the polyester type resin, a resin having a melting temperature of a crystal of 240° C. or lower is preferably used. In the production of the shrink film, it is commonly carried out to reuse trimming pieces of drawing selvage and recycle films as a recycle material. Generally, such recycle materials are mixed with polystyrene type resins as a material for the intermediate layer, but since the polystyrene type resin and the polyester type resin are different in properties such as a melting point, there may be cases where the polyester type resin is extruded in an unmelted state when a film is formed at a temperature suitable for molding the polystyrene type resin. However, by using a polyester type resin having a relatively low melting temperature of a crystal or not having a melting temperature of a crystal, it is possible to prevent an unmelted substance of the polyester type resin from being produced as an extraneous substance in a formed film. On the other hand, when the melting temperature of a crystal is higher than 240° C., a defective condition that in the case of molding the resin as a recycle material, an unmelted substance of the polyester type resin may remain as an extraneous substance in the film to cause defective appearance or defective printing such as intermittence of ink during printing. The melting temperature of a crystal is more preferably 220° C. or lower.

In the heat-shrinkable multilayer resin film, the intermediate layer is bonded to the outer surface layers with an adhesive layer comprising a hydrogen addition product of an aromatic vinyl hydrocarbon-conjugated diene copolymer, having at least one functional group selected from the group consisting of a carboxylic group, an acid anhydride group, an amino group, an epoxy group and a hydroxyl group in a molecule. Such an adhesive layer has a high affinity of both the polystyrene type resin composing the intermediate layer and the polyester type resin composing the outer surface layers, the both layers can be bonded to each other with high strength. In addition, since the adhesive layer is dissolved in or swelled with a solvent which dissolves polyester type resin composing the outer surface layers, the solvent can permeate into the shrink label at the time of center sealing, and this can prevent the delamination from occurring during subsequent heat-shrinkage. Further, since both the intermediate layer and the outer surface layer can be formed by a co-extrusion process, this heat-shrinkable multilayer resin film also has excellent productivity.

The hydrogen addition product of an aromatic vinyl hydrocarbon-conjugated diene copolymer, having at least one functional group selected from the group consisting of a carboxylic group, an acid anhydride group, an amino group, an epoxy group and a hydroxyl group in a molecule, is not particularly limited, and as the hydrogen addition product, a maleic anhydride modified styrene-ethylene/butylene-styrene block copolymer (maleic anhydride modified SEBS resin), an amine modified styrene-ethylene/butylene-styrene block copolymer (amine modified SEBS resin), an amine modified styrene-butadiene/butylene-styrene block copolymer (amine modified SBBS resin) and a carboxylic acid modified styrene-butadiene/butylene-styrene block copolymer (carboxylic acid modified SBBS resin) are suitable.

Both the SEBS resin and the SBBS resin can be prepared by adding hydrogen to a SBS resin, and modified products thereof can be easily prepared by further grafting the SEBS resin and the SBBS resin with maleic anhydride or reacting the SEBS resin and the SBBS resin with an amine compound, a carboxylic acid compound, and the like to add amine or carboxylic acid to end portions of these resins.

A preferable lower limit of the content of aromatic vinyl hydrocarbon components in the hydrogen addition product of an aromatic vinyl hydrocarbon-conjugated diene copolymer, having at least one functional group selected from the group consisting of a carboxylic group, an acid anhydride group, an amino group, an epoxy group and a hydroxyl group in a molecule, is 20% by weight, and a preferable upper limit is 80% by weight. When this content is less than 20% by weight, the delamination of a shrink label is apt to occur in covering a container with the shrink label. When the content is more than 80% by weight, the tackiness of the adhesive layer is deteriorated and adequate adhesion strength may not be attained. A more preferable upper limit is 50% by weight.

A preferable lower limit of the content of the functional group in the hydrogen addition product of an aromatic vinyl hydrocarbon-conjugated diene copolymer, having at least one functional group selected from the group consisting of a carboxylic group, an acid anhydride group, an amino group, an epoxy group and a hydroxyl group in a molecule, is 0.05% by weight, and a preferable upper limit is 5.0% by weight. When the content is less than 0.05% by weight, particularly adhesion to the outer surface layer may become insufficient, and when the content is more than 5.0% by weight, the resin may become apt to be deteriorated by heat to produce extraneous substances such as gel in adding the above functional group. More preferably, the lower limit is 0.1% by weight and the upper limit is 3.0% by weight.

A preferable lower limit of a thickness of the intermediate layer is 22 μm, and a preferable upper limit is 37 μm. When the thickness is less than 22 μm, adequate tearing properties along the perforation may not be attained, and when the thickness is more than 37 μm, adequate heat resistance may not be attained. The more preferable lower limit is 26 μm, and the more preferable upper limit is 36 μm.

A preferable lower limit of a thickness of the outer surface layer is 3 μm, and a preferable upper limit is 10 μm. When the thickness is less than 3 μm, adequate oil resistance or heat resistance may not be attained, and when the thickness is more than 10 μm, adequate tearing properties along the perforation may not be attained. The more preferable lower limit is 4 μm, and the more preferable upper limit is 8 μm.

A preferable lower limit of a thickness of the adhesive layer is 0.7 μm, and a preferable upper limit is 1.5 μm. When the thickness is less than 0.7 μm, adequate adhesion strength may not be attained, and when the thickness is more than 1.5 μm, a heat-shrinkage property may be deteriorated. The more preferable lower limit is 0.8 μm, and the more preferable upper limit is 1.3 μm.

A method of producing the shrink label of the first aspect of the present invention is not particularly limited, but a method of molding the respective layers simultaneously by a co-extrusion process is suitable. For example, in the co-extrusion through a T-die, a method of lamination may be any of a feed block method, a multi-manifold die method, and a combined method thereof. Particularly, by setting an extrusion molding temperature in a location following the portion where resins of the respective layers merge preferably at 230° C. or higher, and more preferably at 240° C. or higher, a multilayer film having high adhesion of all layers can be attained.

Additives such as antioxidants, thermal stabilizers, lubricants, antistatic agents, antiblocking agents may be added to the shrink label of the first aspect of the present invention as required. Generation of gel can be inhibited by adding particularly the thermal stabilizer or the antioxidant.

The shrink label of the first aspect of the present invention may be prepared by using the heat-shrinkable multilayer resin film as a base film, and laminating other layers such as a printing layer on the base film as required.

The shrink label of the second aspect of the present invention is a shrink label, comprising a heat-shrinkable multilayer resin film comprising an intermediate layer comprising a polystyrene type resin and outer surface layers comprising a polyester type resin, with said intermediate layer interposed therebetween, as a base film, wherein the polystyrene type resin composing said intermediate layer is a mixed resin of an aromatic vinyl hydrocarbon-conjugated diene copolymer and an aromatic vinyl hydrocarbon-aliphatic unsaturated carboxylic acid ester copolymer, and said intermediate layer is bonded to said outer surface layers with an adhesive layer comprising a hydrogen addition product of an aromatic vinyl hydrocarbon-conjugated diene copolymer, having at least one functional group selected from the group consisting of a carboxylic group, an acid anhydride group, an amino group, an epoxy group and a hydroxyl group in a molecule.

The present inventors found that in the shrink label comprising a heat-shrinkable multilayer resin film comprising an intermediate layer comprising a mixed resin of an aromatic vinyl hydrocarbon-conjugated diene copolymer and an aromatic vinyl hydrocarbon-aliphatic unsaturated carboxylic acid ester copolymer, being a polystyrene type resin, and outer surface layers comprising a polyester type resin, with the intermediate layer interposed therebetween, as a base film, when the intermediate layer is bonded to the outer surface layers with a specific adhesive layer interposed between the intermediate layer and the outer surface layer, the shrink label can cover containers stably without producing delamination, and these findings have now led to completion of the shrink label of the second aspect of the present invention.

The shrink label of the second aspect of the present invention comprises a heat-shrinkable multilayer resin film comprising an intermediate layer comprising a polystyrene type resin and outer surface layers comprising a polyester type resin, with the intermediate layer interposed therebetween, as a base film.

The polystyrene type resin composing the intermediate layer is a mixed resin of an aromatic vinyl hydrocarbon-conjugated diene copolymer and an aromatic vinyl hydrocarbon-aliphatic unsaturated carboxylic acid ester copolymer. Since a film comprising such a mixed resin has excellent low temperature ductility, the resulting shrink film will have high low temperature resistance and excellent tearing properties along the perforation.

As the aromatic vinyl hydrocarbon-conjugated diene copolymer, similar substances to those in the shrink label of the first aspect of the present invention can be used.

In addition, when the SBS resin, the SIS resin, or the SIBS resin is used as the aromatic vinyl hydrocarbon-conjugated diene copolymer, substances having a styrene content of 65 to 85% by weight and a conjugated diene content of 15 to 35% by weight are preferably used. Resins having such a composition are superior particularly in low temperature shrinkability and tearing properties along the perforation.

The aromatic vinyl hydrocarbon-aliphatic unsaturated carboxylic acid ester copolymer is not particularly limited, and examples of the aromatic vinyl hydrocarbon include styrene, o-methylstyrene, p-methylstyrene, and examples of the unsaturated carboxylic acid ester include methylacrylate, ethylacrylate, propylacrylate, butylacrylate, methylmethacrylate, ethylmethacrylate, propylmethacrylate, butylmethacrylate. These copolymers may be used singly or in combination of two or more species.

When a styrene-butylacrylate copolymer is used as the aromatic vinyl hydrocarbon-aliphatic unsaturated carboxylic acid ester copolymer, substances having a styrene content of 60 to 90% by weight and a butylacrylate content of 10 to 40% by weight are preferably used. By using an aromatic vinyl hydrocarbon-aliphatic unsaturated carboxylic acid ester copolymer having such a composition, a shrink label having excellent low temperature resistance and excellent tearing properties along the perforation can be attained.

A preferable lower limit of an amount of the aromatic vinyl hydrocarbon-conjugated diene copolymer to be mixed in the mixed resin composing the intermediate layer is 20% by weight, and a preferable upper limit is 80% by weight. When the amount is less than 20% by weight, low temperature ductility becomes low and a shrink film may be broken due to dropping it inadvertently during cold storage, and when the amount is more than 80% by weight, shrinkage during the storage of the shrink film, the so-called spontaneous shrinkage, may become large. The more preferable lower limit is 30% by weight and the more preferable upper limit is 70% by weight.

In the second aspect of the present invention, the polyester type resin composing the outer surface layers can be prepared by polycondensating dicarboxylic acid with diol.

Further, the intermediate layer is bonded to the outer surface layers with an adhesive layer comprising a hydrogen addition product of an aromatic vinyl hydrocarbon-conjugated diene copolymer, having at least one functional group selected from the group consisting of a carboxylic group, an acid anhydride group, an amino group, an epoxy group and a hydroxyl group in a molecule.

In the shrink label of the second aspect of the present invention, since the outer surface layers are laminated on the intermediate layer with the adhesive layer described above interposed therebetween the intermediate layer and the outer surface layer, the adhesion strength between the layers is extremely high. Further, since the resin composing the adhesive layer is dissolved in or swelled with a solvent which dissolves polyester type resins, the solvent can permeate into the shrink label at the time of center sealing, and the adhesion is performed as a whole. Therefore, an adhesive force between the layers is improved more at the center seal portion, and the delamination is assumed not to occur.

In addition, in the shrink label of the second aspect of the present invention, since the polyester type resin used in the outer surface layers, the hydrogen addition product of an aromatic vinyl hydrocarbon-conjugated diene copolymer used in the adhesive layer, and the additives are similar to those of the shrink label of the first aspect of the present invention, the detailed descriptions of them are omitted.

In the second aspect of the present invention, a preferable lower limit of a thickness of the intermediate layer is 22 μm, and a preferable upper limit is 37 μm. When the thickness is less than 22 μm, adequate low temperature shrinkability may not be attained or adequate tearing properties along the perforation may not be attained, and when the thickness is more than 37 μm, adequate low temperature resistance is attained. The more preferable lower limit is 26 μm, and the more preferable upper limit is 36 μm.

A preferable lower limit of a thickness of the outer surface layer is 3 μm, and a preferable upper limit is 10 μm. When the thickness is less than 3 μm, adequate oil resistance or low temperature resistance may not be attained, and when the thickness is more than 10 μm, adequate tearing properties along the perforation may not be attained. The more preferable lower limit is 4 μm, and the more preferable upper limit is 8 μm.

A preferable lower limit of a thickness of the adhesive layer is 0.7 μm, and a preferable upper limit is 1.5 μm. When the thickness is less than 0.7 μm, adequate adhesion strength may not be attained, and when the thickness is more than 1.5 μm, a heat-shrinkage property may be deteriorated. The more preferable lower limit is 0.8 μm, and the more preferable upper limit is 1.3 μm.

A method of producing the shrink label of the second aspect of the present invention is not particularly limited, but a method of molding the respective layers simultaneously by co-extrusion process is suitable. For example, in the co-extrusion through a T-die, a method of lamination may be any of a feed block method, a multi-manifold die method, and a combined method thereof. Particularly, by setting an extrusion molding temperature in a location following the portion where resins of the respective layers merge preferably at 230° C. or higher, and more preferably at 240° C. or higher, a multilayer film having high adhesion of all layers can be attained.

The heat-shrinkable multilayer resin film of the present invention is a heat-shrinkable multilayer resin film, comprising an intermediate layer comprising a polystyrene type resin and outer surface layers comprising a polyester type resin, with said intermediate layer interposed therebetween, wherein said intermediate layer contains an ultraviolet absorber.

The present inventors made earnest investigations, and consequently found that by adding an ultraviolet absorber to the intermediate layer of the heat-shrinkable multilayer resin film comprising an intermediate layer comprising a polystyrene type resin and outer surface layers comprising a polyester type resin, with the intermediate layer interposed therebetween, the ultraviolet absorber does not cause bleed out and heat deterioration, an excellent effect of absorbing ultraviolet light and a tearing property along the perforation can be simultaneously pursued and problems in adding the ultraviolet absorber to a heat-shrinkable multilayer film using a polyester type resin or a polystyrene type resin singly can be solved, and these findings have now led to completion of the heat-shrinkable multilayer resin film of the present invention.

The heat-shrinkable multilayer resin film of the present invention comprises an intermediate layer comprising a polystyrene type resin and outer surface layers comprising a polyester type resin, with the intermediate layer interposed therebetween.

Examples of the polystyrene type resin composing the intermediate layer include an aromatic vinyl hydrocarbon-conjugated diene copolymer, and a mixed resin of an aromatic vinyl hydrocarbon-conjugated diene copolymer, an aromatic vinyl hydrocarbon-aliphatic unsaturated carboxylic acid ester copolymer, and the like.

Since the aromatic vinyl hydrocarbon-conjugated diene copolymer has excellent low temperature shrinkability, the resulting shrink film can easily cover the container without producing crinkles and the like, and will have excellent tearing properties along the perforation.

Further, since the mixed resin of an aromatic vinyl hydrocarbon-conjugated diene copolymer and an aromatic vinyl hydrocarbon-aliphatic unsaturated carboxylic acid ester copolymer exhibits excellent low temperature ductility when the mixed resin is formed into a film, the resulting shrink film will have high low temperature resistance and excellent tearing properties along the perforation.

Further, as the aromatic vinyl hydrocarbon-conjugated diene copolymer, an aromatic vinyl hydrocarbon-conjugated diene copolymer having isoprene as a conjugated diene component may be used. Particularly when an aromatic vinyl hydrocarbon-conjugated diene copolymer having a high butadiene rate is used, since crosslinking is apt to proceed due to a butadiene component in molding a film, a defective condition that fish eyes are produced in the resulting film or printability is deteriorated is produced. Contrarily, when the aromatic vinyl hydrocarbon-conjugated diene copolymer having isoprene as a conjugated diene component is used, generation of extraneous substances such as gel can be prevented since crosslinking in molding a film is inhibited.

The reason for this is assumed to be that the butadiene component of the aromatic vinyl hydrocarbon-conjugated diene copolymer produces reactive radicals by heating during molding a film, and thereby another compound is dehydrogenated or added to a double bond to tend to produce chained crosslinking, and on the other hand, the isoprene components produce non-reactive radicals and the isoprene components are bonded to each other to inhibit the proceeding of crosslinking.

In addition, since the aromatic vinyl hydrocarbon-aliphatic unsaturated carboxylic acid ester copolymer used in the heat-shrinkable multilayer resin film of the present invention is similar to that of the shrink label of the second aspect of the present invention, the detailed descriptions are omitted.

When the mixed resin of the aromatic vinyl hydrocarbon-conjugated diene copolymer and the aromatic vinyl hydrocarbon-aliphatic unsaturated carboxylic acid ester copolymer is used as the intermediate layer, a preferable lower limit of an amount of the aromatic vinyl hydrocarbon-conjugated diene copolymer to be mixed is 20% by weight, and a preferable upper limit is 80% by weight in the mixed resin. When the amount is less than 20% by weight, low temperature ductility becomes low and a shrink film may be broken due to dropping it inadvertently during cold storage, and when the amount is more than 80% by weight, shrinkage during the storage of the shrink film, the so-called spontaneous shrinkage, may become large. The more preferable lower limit is 30% by weight and the more preferable upper limit is 70% by weight.

In the heat-shrinkable multilayer resin film of the present invention, the intermediate layer contains an ultraviolet absorber.

By thus adding the ultraviolet absorber, it is possible to provide ultraviolet light blocking properties, and it is possible to prevent the deterioration of the contents of a container to enhance a storage property since particularly a property of blocking ultraviolet light (a wavelength 380 nm or shorter) emitted from solar light or a fluorescent lamp is excellent in the heat-shrinkable multilayer resin film of the present invention.

Further, by containing the ultraviolet absorber in only the intermediate layer comprising a polystyrene type resin, problems such as heat deterioration and roll contamination in adding the ultraviolet absorber to the polyester type resin can be solved. Further, since a desired ultraviolet light blocking property can be achieved even when the content of the ultraviolet absorber is low, the heat-shrinkable multilayer resin film of the present invention becomes advantageous in the cost.

Further, the ultraviolet absorber may be added to the intermediate layer of the shrink label of the first or second aspect of the present invention.

Examples of the ultraviolet absorber include benzophenone type ultraviolet absorbers such as 2,4-dihydroxybenzophenone, 2,2',4,4'-tetrahydroxybenzophenone, 2-hydroxy-4-methoxybenzophenone, 2-hydroxy-4-methoxybenzophenone-5-sulfonic acid, and 2-hydroxy-4-n-octoxybenzophenone; benzotriazole type ultraviolet absorbers such as 2-(2'-hydroxy-4'-n-octoxyphenyl)benzotriazole, 2-(2'-hydroxy-5'-n-methoxyphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-5'-t-octylphenyl)benzotriazole, and 2-[2'-hydroxy-3'-(3",4",5",6"-tetrahydrophthalimidemethyl)-5'-methylphenyl]benzotriazole; benzoate type ultraviolet absorbers such as 2,4-di-t-butylphenyl-3,5-di-t-butyl-4-hydroxybenzoate; salicylate type ultraviolet absorbers such as p-t-butylphenylsalicylate; and cyanoacrylate type ultraviolet absorber such as ethyl-2-cyano-3,3-diphenyl acrylate, and octyl-2-cyano-3,3-diphenyl acrylate; and the like.

Among these, 2-(2'-hydroxy-5'-n-methoxyphenyl)benzotriazole, and 2-(2'-hydroxy-3'-t-butyl-5'-methylphenyl)-5-chlorobenzotriazole are preferable since they have excellent balance between ultraviolet light absorbency and heat resistance.

A preferable lower limit of the content of the ultraviolet absorber is 1 part by weight with respect to 100 parts by weight of materials, such as a base resin, and a recycle material, composing an intermediate layer, and a preferable upper limit is 10 parts by weight. When the content is less than 1 part by weight, ultraviolet light blocking properties become inadequate and there may be cases where a resin film cannot prevent the deterioration of the contents of a container in using the resin film as a shrink label of a container, and when the content is more than 10 parts by weight, mechanical strength of the heat-shrinkable multilayer resin film is decreased and break of the film may occur in converting printing or using the resin film as a shrink label. The more preferable lower limit of the content of the ultraviolet absorber is 2 parts by weight and the more preferable upper limit is 8 parts by weight.

The heat-shrinkable multilayer resin film of the present invention has the outer surface layer comprising a polyester type resin, with the intermediate layer interposed therebetween.

Further, the heat-shrinkable multilayer resin film of the present invention has an adhesive layer comprising a hydrogen addition product of an aromatic vinyl hydrocarbon-conjugated diene copolymer, having at least one functional group selected from the group consisting of a carboxylic group, an acid anhydride group, an amino group, an epoxy group and a hydroxyl group in a molecule, between the intermediate layer and the outer surface layer.

In the heat-shrinkable multilayer resin film of the present invention, since the outer surface layers are laminated on the intermediate layer with the adhesive layer described above interposed between the intermediate layer and the outer surface layer, the adhesion strength between the layers is extremely high. Further, since the resin composing the adhesive layer is dissolved in or swelled with a solvent which dissolves polyester type resins, the solvent can permeate into the shrink label at the time of center sealing, and the adhesion is performed as a whole. Therefore, an adhesive force between the layers is improved more at the center seal portion, and the delamination is assumed not to occur.

Additionally, since the constitutions of the outer surface layer and the adhesive layer are similar to that of the shrink label of the first aspect of the present invention, the detailed descriptions of them are omitted.

A preferable lower limit of a thickness of the heat-shrinkable multilayer resin film of the present invention is 30 µm, and a preferable upper limit is 60 µm. When the thickness is less than 30 µm, the film becomes apt to break, and when the thickness is more than 60 µm, tearing properties along the perforation may be deteriorated.

A preferable lower limit of a thickness of the intermediate layer is 50% of a thickness of the entire heat-shrinkable multilayer resin film, and a preferable upper limit is 85%. When the thickness is less than 50% of the resin film thickness, tearing properties along the perforation may not be attained, and when the thickness is more than 85%, a film surface becomes vulnerable to flaw and an ultraviolet absorber may bleed from the flaw.

A preferable lower limit of a thickness of the outer surface layer is 5% of a thickness of the entire heat-shrinkable multilayer resin film, and a preferable upper limit is 24%. When the thickness is less than 5% of the resin film thickness, adequate oil resistance or low temperature resistance may not be attained, and when the thickness is more than 24%, adequate tearing properties along the perforation may not be attained.

A preferable lower limit of a thickness of the adhesive layer is 0.7 µm, and a preferable upper limit is 1.5 µm. When the thickness is less than 0.7 µm, adequate adhesion strength may not be attained, and when the thickness is more than 1.5 µm, a heat-shrinkage property may be deteriorated. The more preferable lower limit is 0.8 µm, and the more preferable upper limit is 1.3 µm.

A method of producing the heat-shrinkable multilayer resin film of the present invention is not particularly limited, but a method of molding the respective layers simultaneously by co-extrusion process is suitable. For example, in the co-extrusion through a T-die, a method of lamination may be any of a feed block method, a multi-manifold die method, and a combined method thereof. Particularly, by setting an extrusion molding temperature in a location following the portion where resins of the respective layers merge preferably at 230° C. or higher, and more preferably at 240° C. or higher, a multilayer film having high adhesion of all layers can be attained.

Further, a method of adding the ultraviolet absorber is not particularly limited, and examples of the method include a method of charging the ultraviolet absorber directly into an extruder; and a master batch method in which the polystyrene type resin is kneaded with the ultraviolet absorber to prepare a master batch, and then the prepared master batch is mixed with the resin to be diluted.

Additives such as antioxidants, thermal stabilizers, lubricants, antistatic agents, or antiblocking agents may be added to the heat-shrinkable multilayer resin film of the present invention as required. Generation of gel can be inhibited by adding particularly the thermal stabilizer or the antioxidant.

A shrink label can be obtained by using the heat-shrinkable multilayer resin film of the present invention as a base film. Such a shrink label also constitutes the present invention.

The shrink label of the present invention may be prepared by using the heat-shrinkable multilayer resin film as a base film, and laminating other layers such as a printing layer on the base film as required.

Effects of the Invention

In accordance with the present invention, it is possible to provide a shrink label comprising a multilayer film, which is superior in low temperature resistance, heat resistance, oil resistance, tearing properties along the perforation and appearance and does not peel in covering a container, as a base film, and a heat-shrinkable multilayer resin film which can effectively prevent the deterioration of the content of a container due to ultraviolet light and is superior in the tearing properties along the perforation and the oil resistance when the heat-shrinkable multilayer resin film is used as a shrink label for a container, and a shrink label comprising the heat-shrinkable multilayer resin film as a base film.

BEST MODE FOR CARRYING OUT THE INVENTION

Hereinafter, the present invention will be described in more detail by way of examples, but the present invention is not limited to these examples.

EXAMPLE 1

As an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used. In addition, a melting point of this polyester type resin could not be measured.

As an intermediate layer, a styrene-butadiene-styrene copolymer (styrene: 78% by weight, butadiene: 22% by weight, Vicat softening point: 72° C., MFR: 5.6 g/10 minutes) was used.

As an adhesive layer, a maleic anhydride modified styrene-ethylene/butylene-styrene block copolymer (styrene content: 30% by weight, maleic anhydride addition rate: 1.0% by weight, MFR: 4.0 g/10 minutes, specific gravity: 0.92) was used.

These resins were extruded into a heat-shrinkable multilayer resin film having a five-layer structure of outer surface layer (6 μm)/adhesive layer (1 μm)/intermediate layer (31 μm)/adhesive layer (1 μm)/outer surface layer (6 μm) by a co-extrusion process to form a shrink label. Further, an extrusion molding temperature in a location following the portion where the respective layers merge was set at 230° C.

EXAMPLE 2

As an outer surface layer, a polyester type resin, which uses terephthalic acid as a dicarboxylic acid component and contains 70% by mole of a component derived from ethylene glycol, 10% by mole of a component derived from diethylene glycol and 20% by mole of a component derived from 1,4-cyclohexanedimethanol as a diol component, was used. In addition, a melting point of this polyester type resin could not be measured.

As an intermediate layer, a styrene-butadiene-styrene copolymer (styrene: 78% by weight, butadiene: 22% by weight, Vicat softening point: 72° C., MFR: 5.6 g/10 minutes) was used.

As an adhesive layer, a maleic anhydride modified styrene-ethylene/butylene-styrene block copolymer (styrene content: 30% by weight, maleic anhydride addition rate: 1.0% by weight, MFR: 4.0 g/10 minutes, specific gravity: 0.92) was used.

These resins were extruded into a heat-shrinkable multilayer resin film having a five-layer structure of outer surface layer (6 μm)/adhesive layer (1 μm)/intermediate layer (31 μm)/adhesive layer (1 μm)/outer surface layer (6 μm) by a co-extrusion process to form a shrink label. Further, an extrusion molding temperature in a location following the portion where the respective layers merge was set at 230° C.

EXAMPLE 3

As an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As an intermediate layer, a styrene-butadiene-styrene copolymer (styrene: 78% by weight, butadiene: 22% by weight, Vicat softening point: 72° C., MFR: 5.6 g/10 minutes) was used.

As an adhesive layer, a maleic anhydride modified styrene-ethylene/butylene-styrene block copolymer (styrene content: 30% by weight, maleic anhydride addition rate: 0.5% by weight, MFR: 4.0 g/10 minutes, specific gravity: 0.91) was used.

These resins were extruded into a heat-shrinkable multilayer resin film having a five-layer structure of outer surface layer (6 μm)/adhesive layer (1 μm)/intermediate layer (31 μm)/adhesive layer (1 μm)/outer surface layer (6 μm) by a co-extrusion process to form a shrink label. Further, an extrusion molding temperature in a location following the portion where the respective layers merge was set at 240° C.

EXAMPLE 4

As an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As an intermediate layer, a styrene-butadiene-styrene copolymer (styrene: 78% by weight, butadiene: 22% by weight, Vicat softening point: 72° C., MFR: 5.6 g/10 minutes) was used.

As an adhesive layer, an amine modified styrene-ethylene/butylene-styrene block copolymer (styrene content: 30% by weight, MFR: 4.0 g/10 minutes, specific gravity: 0.91, amino group at one end) was used.

These resins were extruded into a heat-shrinkable multilayer resin film having a five-layer structure of outer surface layer (6 μm)/adhesive layer (1 μm)/intermediate layer (31 μm)/adhesive layer (1 μm)/outer surface layer (6 μm) by a co-extrusion process to form a shrink label. Further, an extrusion molding temperature in a location following the portion where the respective layers merge was set at 240° C.

EXAMPLE 5

As an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As an intermediate layer, a styrene-butadiene-styrene copolymer (styrene: 75% by weight, butadiene: 25% by weight, Vicat softening point: 83° C., MFR: 7.8 g/10 minutes) was used.

As an adhesive layer, a maleic anhydride modified styrene-ethylene/butylene-styrene block copolymer (styrene content: 30% by weight, maleic anhydride addition rate: 1.0% by weight, MFR: 4.0 g/10 minutes, specific gravity: 0.92) was used.

These resins were extruded into a heat-shrinkable multilayer resin film having a five-layer structure of outer surface layer (6 μm)/adhesive layer (1 μm)/intermediate layer (31 μm)/adhesive layer (1 μm)/outer surface layer (6 μm) by a co-extrusion process to form a shrink label. Further, an extrusion molding temperature in a location following the portion where the respective layers merge was set at 230° C.

EXAMPLE 6

As an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As an intermediate layer, a styrene-butadiene-styrene copolymer (styrene: 78% by weight, butadiene: 22% by weight, Vicat softening point: 72° C., MFR: 5.6 g/10 minutes) was used.

As an adhesive layer, a maleic anhydride modified styrene-ethylene/butylene-styrene block copolymer (styrene content: 30% by weight, maleic anhydride addition rate: 1.0% by weight, MFR: 4.0 g/10 minutes, specific gravity: 0.92) was used.

These resins were extruded into a heat-shrinkable multilayer resin film having a five-layer structure of outer surface layer (9 μm)/adhesive layer (1 μm)/intermediate layer (25 μm)/adhesive layer (1 μm)/outer surface layer (9 μm) by a co-extrusion process to form a shrink label. Further, an extrusion molding temperature in a location following the portion where the respective layers merge was set at 230° C.

EXAMPLE 7

As an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As an intermediate layer, a styrene-isoprene-butadiene-styrene copolymer (styrene: 75% by weight, isoprene 10% by weight, butadiene: 15% by weight, Vicat softening point: 82° C., MFR: 8.0 g/10 minutes) was used.

As an adhesive layer, a maleic anhydride modified styrene-ethylene/butylene-styrene block copolymer (styrene content: 30% by weight, maleic anhydride addition rate: 1.0% by weight, MFR: 4.0 g/10 minutes, specific gravity: 0.92) was used.

These resins were extruded into a heat-shrinkable multilayer resin film having a five-layer structure of outer surface layer (6 μm)/adhesive layer (1 μm)/intermediate layer (31 μm)/adhesive layer (1 μm)/outer surface layer (6 μm) by a co-extrusion process to form a shrink label. Further, an extrusion molding temperature in a location following the portion where the respective layers merge was set at 230° C.

EXAMPLE 8

As an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As an intermediate layer, a compounded resin A (styrene: 84.5% by weight, isoprene 1.5% by weight, butadiene: 14% by weight, Vicat softening point: 70° C., MFR: 9.0 g/10 minutes) prepared by compounding a styrene-isoprene-butadiene-styrene copolymer with a styrene-butadiene-styrene copolymer was used.

As an adhesive layer, a maleic anhydride modified styrene-ethylene/butylene-styrene block copolymer (styrene content: 30% by weight, maleic anhydride addition rate: 1.0% by weight, MFR: 4.0 g/10 minutes, specific gravity: 0.92) was used.

These resins were extruded into a heat-shrinkable multilayer resin film having a five-layer structure of outer surface layer (6 μm)/adhesive layer (1 μm)/intermediate layer (31 μm)/adhesive layer (1 μm)/outer surface layer (6 μm) by a co-extrusion process to form a shrink label. Further, an extrusion molding temperature in a location following the portion where the respective layers merge was set at 240° C.

EXAMPLE 9

As an outer surface layer, a polyester type resin, which uses terephthalic acid as a dicarboxylic acid component and contains 70% by mole of a component derived from ethylene glycol, 10% by mole of a component derived from diethylene glycol and 20% by mole of a component derived from 1,4-cyclohexanedimethanol as a diol component, was used.

As an intermediate layer, a resin comprising 70% by weight of the compounded resin A (styrene: 84.5% by weight, isoprene 1.5% by weight, butadiene: 14% by weight, Vicat softening point: 70° C., MFR: 9.0 g/10 minutes) and 30% by weight of a styrene-butadiene-styrene copolymer (styrene: 77% by weight, butadiene: 23% by weight, Vicat softening point: 82° C., MFR: 6.0 g/10 minutes) was used.

As an adhesive layer, a maleic anhydride modified styrene-ethylene/butylene-styrene block copolymer (styrene content: 30% by weight, maleic anhydride addition rate: 0.5% by weight, MFR: 4.0 g/10 minutes, specific gravity: 0.91) was used.

These resins were extruded into a heat-shrinkable multilayer resin film having a five-layer structure of outer surface layer (6 μm)/adhesive layer (1 μm)/intermediate layer (31 μm)/adhesive layer (1 μm)/outer surface layer (6 μm) by a co-extrusion process to form a shrink label. Further, an extrusion molding temperature in a location following the portion where the respective layers merge was set at 240° C.

EXAMPLE 10

As an outer surface layer, a resin comprising 70% by weight of a polyester type resin (melting point: 211° C.) which contains 94% by mole of terephthalic acid and 6% by mole of adipic acid as a dicarboxylic acid component and contains 88% by mole of a component derived from ethylene glycol and 12% by mole of a component derived from 1,4-cyclohexanedimethanol as a diol component, and 30% by weight of a polyester type resin which uses terephthalic acid as a dicarboxylic acid component and contains 67% by mole of a component derived from ethylene glycol and 33% by mole of a component derived from 1,4-cyclohexanedimethanol as a diol component was used.

As an intermediate layer, a resin comprising 70% by weight of the compounded resin A (styrene: 84.5% by weight, isoprene 1.5% by weight, butadiene: 14% by weight, Vicat softening point: 70° C., MFR: 9.0 g/10 minutes) and 30% by weight of a styrene-butadiene-styrene copolymer (styrene: 77% by weight, butadiene: 23% by weight, Vicat softening point: 82° C., MFR: 6.0 g/10 minutes) was used.

As an adhesive layer, an amine modified styrene-ethylene/butylene-styrene block copolymer in which an amino group is introduced in one end of a polymer (styrene content: 30% by weight, MFR: 4.0 g/10 minutes, specific gravity: 0.91) was used.

These resins were extruded into a heat-shrinkable multi-layer resin film having a five-layer structure of outer surface layer (6 μm)/adhesive layer (1 μm)/intermediate layer (31 μm)/adhesive layer (1 μm)/outer surface layer (6 μm) by a co-extrusion process to form a shrink label. Further, an extrusion molding temperature in a location following the portion where the respective layers merge was set at 240° C.

EXAMPLE 11

As an outer surface layer, a resin comprising 50% by weight of a polyester type resin (melting point: 216° C.) which contains 83% by mole of terephthalic acid, 11% by mole of isophthalic acid and 6% by mole of adipic acid as a dicarboxylic acid component, and uses ethylene glycol as a diol component, and 50% by weight of a polyester type resin which uses terephthalic acid as a dicarboxylic acid component and contains 70% by mole of a component derived from ethylene glycol, 10% by mole of a component derived from diethylene glycol and 20% by mole of a component derived from 1,4-cyclohexanedimethanol as a diol component was used.

As an intermediate layer, a resin comprising 70% by weight of the compounded resin A (styrene: 84.5% by weight, isoprene 1.5% by weight, butadiene: 14% by weight, Vicat softening point: 70° C., MFR: 9.0 g/10 minutes) and 30% by weight of a styrene-butadiene-styrene copolymer (styrene: 77% by weight, butadiene: 23% by weight, Vicat softening point: 82° C., MFR: 6.0 g/10 minutes) was used.

As an adhesive layer, a maleic anhydride modified styrene-ethylene/butylene-styrene block copolymer (styrene content: 30% by weight, maleic anhydride addition rate: 1.0% by weight, MFR: 4.0 g/10 minutes, specific gravity: 0.92) was used.

These resins were extruded into a heat-shrinkable multi-layer resin film having a five-layer structure of outer surface layer (8 μm)/adhesive layer (1 μm)/intermediate layer (29 μm)/adhesive layer (1 μm)/outer surface layer (8 μm) by a co-extrusion process to form a shrink label. Further, an extrusion molding temperature in a location following the portion where the respective layers merge was set at 230° C.

EXAMPLE 12

As an outer surface layer, a resin comprising 80% by weight of a polyester type resin which uses terephthalic acid as a dicarboxylic acid component and contains 70% by mole of a component derived from ethylene glycol, 10% by mole of a component derived from diethylene glycol and 20% by mole of a component derived from 1,4-cyclohexanedimethanol as a diol component, and 20% by weight of a polyester type resin (melting point: 227° C.) which uses terephthalic acid as a dicarboxylic acid component and 1,4-butanediol as a diol component was used.

As an intermediate layer, a compounded resin A (styrene: 84.5% by weight, isoprene 1.5% by weight, butadiene: 14% by weight, Vicat softening point: 70° C., MFR: 9.0 g/10 minutes) prepared by compounding a styrene-isoprene-butadiene-styrene copolymer with a styrene-butadiene-styrene copolymer was used.

As an adhesive layer, a maleic anhydride modified styrene-ethylene/butylene-styrene block copolymer (styrene content: 30% by weight, maleic anhydride addition rate: 0.5% by weight, MFR: 4.0 g/10 minutes, specific gravity: 0.91) was used.

These resins were extruded into a heat-shrinkable multi-layer resin film having a five-layer structure of outer surface layer (6 μm)/adhesive layer (1 μm)/intermediate layer (31 μm)/adhesive layer (1 μm)/outer surface layer (6 μm) by a co-extrusion process to form a shrink label. Further, an extrusion molding temperature in a location following the portion where the respective layers merge was set at 240° C.

EXAMPLE 13

As an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As an intermediate layer, a resin comprising 70% by weight of the compounded resin B (styrene: 85% by weight, butadiene: 15% by weight, Vicat softening point: 70° C., MFR: 8.0 g/10 minutes) prepared by compounding a styrene-butadiene-styrene copolymer and 30% by weight of a styrene-butadiene-styrene copolymer (styrene: 77% by weight, butadiene: 23% by weight, Vicat softening point: 82° C., MFR: 6.0 g/10 minutes) was used.

As an adhesive layer, a maleic anhydride modified styrene-ethylene/butylene-styrene block copolymer (styrene content: 30% by weight, maleic anhydride addition rate: 1.0% by weight, MFR: 4.0 g/10 minutes, specific gravity: 0.92) was used.

These resins were extruded into a heat-shrinkable multi-layer resin film having a five-layer structure of outer surface layer (6 μm)/adhesive layer (1 μm)/intermediate layer (31 μm)/adhesive layer (1 μm)/outer surface layer (6 μm) by a co-extrusion process to form a shrink label. Further, an extrusion molding temperature in a location following the portion where the respective layers merge was set at 230° C.

COMPARATIVE EXAMPLE 1

A polyester type resin, which uses terephthalic acid as a dicarboxylic acid component and contains 67% by mole of a component derived from ethylene glycol and 33% by mole of a component derived from 1,4-cyclohexanedimethanol as a diol component, was used and extruded into a film with a thickness of 45 μm by an extrusion process to form a shrink label.

COMPARATIVE EXAMPLE 2

A styrene-butadiene-styrene copolymer (styrene: 78% by weight, butadiene: 22% by weight, Vicat softening point: 72° C., MFR: 5.6 g/10 minutes) was used and extruded into a film with a thickness of 45 μm by an extrusion process to form a shrink label.

COMPARATIVE EXAMPLE 3

As an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As an intermediate layer, a styrene-butadiene-styrene copolymer (styrene: 78% by weight, butadiene: 22% by weight, Vicat softening point: 72° C., MFR: 5.6 g/10 minutes) was used.

As an adhesive layer, maleic anhydride modified linear low density polyethylene (LLDPE) was used.

These resins were extruded into a heat-shrinkable multilayer resin film having a five-layer structure of outer surface layer (6 μm)/adhesive layer (1 μm)/intermediate layer (31 μm)/adhesive layer (1 μm)/outer surface layer (6 μm) by a co-extrusion process to form a shrink label. Further, an extrusion molding temperature in a location following the portion where the respective layers merge was set at 250° C.

COMPARATIVE EXAMPLE 4

As an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As an intermediate layer, a styrene-butadiene-styrene copolymer (styrene: 78% by weight, butadiene: 22% by weight, Vicat softening point: 72° C., MFR: 5.6 g/10 minutes) was used.

These resins were extruded into a heat-shrinkable multilayer resin film having a three-layer structure of outer surface layer (6 μm)/intermediate layer (33 μm)/outer surface layer (6 μm) by a co-extrusion process to form a shrink label. Further, an extrusion molding temperature in a location following the portion where the respective layers merge was set at 250° C.

(Evaluation)

The shrink labels produced in Examples 1 to 13 and Comparative Examples 1 to 4 were evaluated according to the following methods.

The results of the evaluation are shown in Table 1.

(1) Covering Property and Appearance

Both edges of the shrink label were bonded to each other with a mixed solvent of 100 parts by weight of 1,3-dioxolane and 50 parts by weight of cyclohexane to process the label into a tubular form of 6.5 cm in inner diameter. The obtained tubular shrink label is put around a PET bottle having a diameter of 6.5 cm, and the label was shrunk by blowing hot air of 85° C. on the label to cover the bottle. In addition, the perforation was previously provided.

After hundred PET bottles were covered with the shrink labels, the shrink labels were scratched with a fingernail and thereafter, conditions in the entire shrink label covering the PET bottle were visually observed with a focus on a center seal portion, and covering property and appearance were rated according to the following criteria.

o: There were no delaminations nor crinkles.

x: There was at least one delamination or crinkle.

(2) Heat Resistance

After thirty PET bottles (one which the shrink label can cover without producing delaminations or crinkles) covered with the shrink label were left at rest on a hot plate kept at 130° C. for 15 minutes, the condition of each shrink label was visually observed to evaluate the heat resistance according to the following criteria.

o: There were no crinkles nor breaks in the shrink label.

x: There was at least one crinkle or break in the shrink label.

(3) Tearing Property Along Perforation

The shrink labels of thirty PET bottles (one which the shrink label can cover without producing delaminations or crinkles) covered with the shrink label were torn off along the perforation with a hand. The conditions in doing so were observed to evaluate the tearing property along perforation according to the following criteria.

o: The shrink labels could be easily torn off along the perforation.

x: Some shrink labels are hard to tear off along the perforation.

(4) Oil Resistance

After an edible oil was applied onto each shrink label of thirty PET bottles (one which the shrink label can cover without producing delaminations or crinkles) covered with the shrink label, the condition of the shrink label was visually observed to evaluate the oil resistance according to the following criteria.

o: There were no crinkles nor breaks in the shrink label.

x: There was at least one crinkle or break in the shrink label.

(5) Strength Between Layers

A layer including the outer surface layer is taken as a peeling layer, and a layer including the intermediate layer is taken as a layer to be peeled. Strength in peeling the peeling layer from the layer to be peeled in 10 mm in width in the direction of 180° angle was measured.

TABLE 1

|  | Covering property and appearance | Heat resistance | Tearing property | Oil resistance | Strength between layers (N/10 mm) |
| --- | --- | --- | --- | --- | --- |
| Example 1 | o | o | o | o | 1.2 |
| Example 2 | o | o | o | o | 1.3 |
| Example 3 | o | o | o | o | 1.1 |
| Example 4 | o | o | o | o | 1.1 |
| Example 5 | o | o | o | o | 1.3 |
| Example 6 | o | o | o | o | 1.2 |
| Example 7 | o | o | o | o | 1.3 |
| Example 8 | o | o | o | o | 1.1 |
| Example 9 | o | o | o | o | 1.2 |
| Example 10 | o | o | o | o | 1.2 |
| Example 11 | o | o | o | o | 1.2 |
| Example 12 | o | o | o | o | 1.1 |
| Example 13 | o | o | o | o | 1.3 |

TABLE 1-continued

| | Covering property and appearance | Heat resistance | Tearing property | Oil resistance | Strength between layers (N/10 mm) |
|---|---|---|---|---|---|
| Comparative Example 1 | x | ○ | x | ○ | — |
| Comparative Example 2 | ○ | x | ○ | x | — |
| Comparative Example 3 | x | ○ | ○ | ○ | 0.7 |
| Comparative Example 4 | x | ○ | ○ | ○ | 0.2 |

EXAMPLE 14

As an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used. In addition, a melting point of this polyester type resin could not be measured.

As an intermediate layer, a mixed resin of 50% by weight of a styrene-butadiene block copolymer (styrene: 75% by weight, butadiene: 25% by weight, Vicat softening point: 83° C., MFR: 6.0 g/10 minutes) and 50% by weight of a styrene-butylacrylate copolymer (styrene: 85% by weight, butylacrylate 15% by weight, Vicat softening point: 70° C., MFR: 4.0 g/10 minutes) was used.

As an adhesive layer, a maleic anhydride modified styrene-ethylene/butylene-styrene block copolymer (styrene content: 30% by weight, maleic anhydride addition rate: 1.0% by weight, MFR: 4.0 g/10 minutes, specific gravity: 0.92) was used.

These resins were extruded into a heat-shrinkable multilayer resin film having a five-layer structure of outer surface layer (6 μm)/adhesive layer (1 μm)/intermediate layer (31 μm)/adhesive layer (1 μm)/outer surface layer (6 μm) by a co-extrusion process to form a shrink label. Further, an extrusion molding temperature in a location following the portion where the respective layers merge was set at 230° C.

EXAMPLE 15

As an outer surface layer, a polyester type resin, which uses terephthalic acid as a dicarboxylic acid component and contains 70% by mole of a component derived from ethylene glycol, 10% by mole of a component derived from diethylene glycol and 20% by mole of a component derived from 1,4-cyclohexanedimethanol as a diol component, was used. In addition, a melting point of this polyester type resin could not be measured.

As an intermediate layer, a mixed resin of 50% by weight of a styrene-butadiene block copolymer (styrene: 75% by weight, butadiene: 25% by weight, Vicat softening point: 83° C., MFR: 6.0 g/10 minutes) and 50% by weight of a styrene-butylacrylate copolymer (styrene: 85% by weight, butylacrylate 15% by weight, Vicat softening point: 70° C., MFR: 4.0 g/10 minutes) was used.

As an adhesive layer, a maleic anhydride modified styrene-ethylene/butylene-styrene block copolymer (styrene content: 30% by weight, maleic anhydride addition rate: 1.0% by weight, MFR: 4.0 g/10 minutes, specific gravity: 0.92) was used.

These resins were extruded into a heat-shrinkable multilayer resin film having a five-layer structure of outer surface layer (6 μm)/adhesive layer (1 μm)/intermediate layer (31 μm)/adhesive layer (1 μm)/outer surface layer (6 μm) by a co-extrusion process to form a shrink label. Further, an extrusion molding temperature in a location following the portion where the respective layers merge was set at 230° C.

EXAMPLE 16

As an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As an intermediate layer, a mixed resin comprising 50% by weight of a styrene-butadiene-styrene copolymer (styrene: 75% by weight, butadiene: 25% by weight, Vicat softening point: 83° C., MFR: 6.0 g/10 minutes) and 50% by weight of a styrene-butylacrylate copolymer (styrene: 85% by weight, butylacrylate 15% by weight, Vicat softening point: 70° C., MFR: 4.0 g/10 minutes) was used.

As an adhesive layer, a maleic anhydride modified styrene-ethylene/butylene-styrene block copolymer (styrene content: 30% by weight, maleic anhydride addition rate: 0.5% by weight, MFR: 4.0 g/10 minutes, specific gravity: 0.91) was used.

These resins were extruded into a heat-shrinkable multilayer resin film having a five-layer structure of outer surface layer (6 μm)/adhesive layer (1 μm)/intermediate layer (31 μm)/adhesive layer (1 μm)/outer surface layer (6 μm) by a co-extrusion process to form a shrink label. Further, an extrusion molding temperature in a location following the portion where the respective layers merge was set at 240° C.

EXAMPLE 17

As an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As an intermediate layer, a mixed resin of 50% by weight of a styrene-butadiene block copolymer (styrene: 75% by weight, butadiene: 25% by weight, Vicat softening point: 83° C., MFR: 6.0 g/10 minutes) and 50% by weight of a styrene-butylacrylate copolymer (styrene: 85% by weight, butylacrylate 15% by weight, Vicat softening point: 70° C., MFR: 4.0 g/10 minutes) was used.

As an adhesive layer, an amine modified styrene-ethylene/butylene-styrene block copolymer (styrene content: 30% by weight, MFR: 4.0 g/10 minutes, specific gravity: 0.91, amino group at one end) was used.

These resins were extruded into a heat-shrinkable multilayer resin film having a five-layer structure of outer surface layer (6 μm)/adhesive layer (1 μm)/intermediate layer (31 μm)/adhesive layer (1 μm)/outer surface layer (6 μm) by a co-extrusion process to form a shrink label. Further, an extrusion molding temperature in a location following the portion where the respective layers merge was set at 240° C.

EXAMPLE 18

As an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As an intermediate layer, a mixed resin of 30% by weight of a styrene-butadiene block copolymer (styrene: 75% by weight, butadiene: 25% by weight, Vicat softening point: 83° C., MFR: 6.0 g/10 minutes) and 70% by weight of a styrene-butylacrylate copolymer (styrene: 85% by weight, butylacrylate 15% by weight, Vicat softening point: 70° C., MFR: 4.0 g/10 minutes) was used.

As an adhesive layer, a maleic anhydride modified styrene-ethylene/butylene-styrene block copolymer (styrene content: 30% by weight, maleic anhydride addition rate: 1.0% by weight, MFR: 4.0 g/10 minutes, specific gravity: 0.92) was used.

These resins were extruded into a heat-shrinkable multi-layer resin film having a five-layer structure of outer surface layer (6 μm)/adhesive layer (1 μm)/intermediate layer (31 μm)/adhesive layer (1 μm)/outer surface layer (6 μm) by a co-extrusion process to form a shrink label. Further, an extrusion molding temperature in a location following the portion where the respective layers merge was set at 240° C.

EXAMPLE 19

As an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As an intermediate layer, a mixed resin of 50% by weight of a styrene-butadiene block copolymer (styrene: 75% by weight, butadiene: 25% by weight, Vicat softening point: 83° C., MFR: 6.0 g/10 minutes) and 50% by weight of a styrene-butylacrylate copolymer (styrene: 85% by weight, butylacrylate 15% by weight, Vicat softening point: 70° C., MFR: 4.0 g/10 minutes) was used.

As an adhesive layer, a maleic anhydride modified styrene-ethylene/butylene-styrene block copolymer (styrene content: 30% by weight, maleic anhydride addition rate: 1.0% by weight, MFR: 4.0 g/10 minutes, specific gravity: 0.92) was used.

These resins were extruded into a heat-shrinkable multi-layer resin film having a five-layer structure of outer surface layer (9 μm)/adhesive layer (1 μm)/intermediate layer (25 μm)/adhesive layer (1 μm)/outer surface layer (9 μm) by a co-extrusion process to form a shrink label. Further, an extrusion molding temperature in a location following the portion where the respective layers merge was set at 230° C.

EXAMPLE 20

As an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As an intermediate layer, a mixed resin comprising 50% by weight of a styrene-isoprene-butadiene-styrene copolymer (styrene: 75% by weight, isoprene 10% by weight, butadiene: 15% by weight, Vicat softening point: 82° C., MFR: 8.0 g/10 minutes) and 50% by weight of a styrene-butylacrylate copolymer (styrene: 85% by weight, butylacrylate 15% by weight, Vicat softening point: 70° C., MFR: 4.0 g/10 minutes) was used.

As an adhesive layer, a maleic anhydride modified styrene-ethylene/butylene-styrene block copolymer (styrene content: 30% by weight, maleic anhydride addition rate: 1.0% by weight, MFR: 4.0 g/10 minutes, specific gravity: 0.92) was used.

These resins were extruded into a heat-shrinkable multi-layer resin film having a five-layer structure of outer surface layer (6 μm)/adhesive layer (1 μm)/intermediate layer (31 μm)/adhesive layer (1 μm)/outer surface layer (6 μm) by a co-extrusion process to form a shrink label. Further, an extrusion molding temperature in a location following the portion where the respective layers merge was set at 230° C.

EXAMPLE 21

As an outer surface layer, a mixed resin comprising 70% by weight of a polyester type resin (melting point: 211° C.) which contains 94% by mole of terephthalic acid and 6% by mole of adipic acid as a dicarboxylic acid component and contains 88% by mole of a component derived from ethylene glycol and 12% by mole of a component derived from 1,4-cyclohexanedimethanol as a diol component, and 30% by weight of a polyester type resin which uses terephthalic acid as a dicarboxylic acid component and contains 67% by mole of a component derived from ethylene glycol and 33% by mole of a component derived from 1,4-cyclohexanedimethanol as a diol component was used.

As an intermediate layer, a mixed resin comprising 70% by weight of a styrene-butylacrylate copolymer (styrene: 85% by weight, butylacrylate 15% by weight, Vicat softening point: 70° C., MFR: 4.0 g/10 minutes) and 30% by weight of a styrene-isoprene-butadiene-styrene copolymer (styrene: 70% by weight, isoprene 15% by weight, butadiene: 15% by weight, Vicat softening point: 65° C., MFR: 10 g/10 minutes) was used.

As an adhesive layer, a maleic anhydride modified styrene-ethylene/butylene-styrene block copolymer (styrene content: 30% by weight, maleic anhydride addition rate: 1.0% by weight, MFR: 4.0 g/10 minutes, specific gravity: 0.92) was used.

These resins were extruded into a heat-shrinkable multi-layer resin film having a five-layer structure of outer surface layer (6 μm)/adhesive layer (1 μm)/intermediate layer (31 μm)/adhesive layer (1 μm)/outer surface layer (6 μm) by a co-extrusion process to form a shrink label. Further, an extrusion molding temperature in a location following the portion where the respective layers merge was set at 230° C.

COMPARATIVE EXAMPLE 5

A mixed resin of 50% by weight of a styrene-butadiene block copolymer (styrene: 75% by weight, butadiene: 25% by weight, Vicat softening point: 83° C., MFR: 6.0 g/10 minutes) and 50% by weight of a styrene-butylacrylate copolymer (styrene: 85% by weight, butylacrylate 15% by weight, Vicat softening point: 70° C., MFR: 4.0 g/10 minutes) was used and extruded into a film with a thickness of 45 μm by an extrusion process to form a shrink label.

COMPARATIVE EXAMPLE 6

As an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As an intermediate layer, a mixed resin of 50% by weight of a styrene-butadiene block copolymer (styrene: 75% by weight, butadiene: 25% by weight, Vicat softening point: 83° C.) and 50% by weight of a styrene-butylacrylate copolymer (styrene: 85% by weight, butylacrylate 15% by weight, Vicat softening point: 70° C.) was used.

As an adhesive layer, maleic anhydride modified linear low density polyethylene (LLDPE) was used.

These resins were extruded into a heat-shrinkable multilayer resin film having a five-layer structure of outer surface layer (6 μm)/adhesive layer (1 μm)/intermediate layer (31 μm)/adhesive layer (1 μm)/outer surface layer (6 μm) by a co-extrusion process to form a shrink label. Further, an extrusion molding temperature in a location following the portion where the respective layers merge was set at 250° C.

COMPARATIVE EXAMPLE 7

As an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As an intermediate layer, a mixed resin of 50% by weight of a styrene-butadiene block copolymer (styrene: 75% by weight, butadiene: 25% by weight, Vicat softening point: 83° C.) and 50% by weight of a styrene-butylacrylate copolymer (styrene: 85% by weight, butylacrylate 15% by weight, Vicat softening point: 70° C.) was used.

These resins were extruded into a heat-shrinkable multilayer resin film having a three-layer structure of outer surface layer (6 μm)/intermediate layer (33 μm)/outer surface layer (6 μm) by a co-extrusion process to form a shrink label. Further, an extrusion molding temperature in a location following the portion where the respective layers merge was set at 250° C.

(Evaluation)

On the shrink labels produced in Examples 14 to 21 and Comparative Examples 1, and 5 to 7, a covering property and appearance, a tearing property along the perforation, oil resistance, and strength between layers were evaluated according to the same methods as those described above. Further, low temperature resistance was evaluated according to the following method.

The results of the evaluation are shown in Table 2.

(Low Temperature Resistance)

After thirty PET bottles (one which the shrink label can cover without producing delaminations or crinkles) covered with the shrink label were dropped from heights of 70 cm with the bottle kept at 4° C., the condition of each shrink label was visually observed to evaluate the low temperature resistance according to the following criteria.

o: There were no breaks from the perforation.

x: There was at least one break along the perforation.

TABLE 2

|  | Covering property and appearance | Low temperature resistance | Tearing property | Oil resistance | Strength between layers (N/10 mm) |
|---|---|---|---|---|---|
| Example 14 | o | o | o | o | 1.2 |
| Example 15 | o | o | o | o | 1.2 |
| Example 16 | o | o | o | o | 1.1 |
| Example 17 | o | o | o | o | 1.1 |
| Example 18 | o | o | o | o | 1.1 |
| Example 19 | o | o | o | o | 1.2 |
| Example 20 | o | o | o | o | 1.2 |
| Example 21 | o | o | o | o | 1.1 |
| Comparative Example 1 | x | o | x | o | — |
| Comparative Example 5 | o | x | o | x | — |
| Comparative Example 6 | x | o | o | o | 0.7 |
| Comparative Example 7 | x | o | o | o | 0.2 |

EXAMPLE 22

As an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As an intermediate layer, a mixture prepared by adding 2.5 parts by weight of 2-(2'-hydroxy-3'-t-butyl-5'-methylphenyl)-5-chlorobenzotriazole as an ultraviolet absorber to 100 parts by weight of a styrene-butadiene copolymer (styrene: 78% by weight, butadiene: 22% by weight, Vicat softening point: 72° C., MFR: 5.6 g/10 minutes) was used.

As an adhesive layer, a maleic anhydride addition product of a hydrogen addition product of a styrene-butadiene copolymer (styrene content: 30% by weight, maleic anhydride addition rate: 0.5% by weight, MFR: 4.0 g/10 minutes, specific gravity: 0.91) was used.

These resins were extruded into a heat-shrinkable multilayer resin film having a five-layer structure of outer surface layer (6 μm)/adhesive layer (1 μm)/intermediate layer (31 μm)/adhesive layer (1 μm)/outer surface layer (6 μm) by a co-extrusion process to form a shrink label.

EXAMPLE 23

As an outer surface layer, a polyester type resin, which uses terephthalic acid as a dicarboxylic acid component and contains 70% by mole of a component derived from ethylene glycol, 10% by mole of a component derived from diethylene glycol and 20% by mole of a component derived from 1,4-cyclohexanedimethanol as a diol component, was used.

As an intermediate layer, a mixture prepared by adding 3.0 parts by weight of 2-(2'-hydroxy-3'-t-butyl-5'-methylphenyl)-5-chlorobenzotriazole as an ultraviolet absorber to a mixed resin of 50% by weight of a styrene-butylacrylate copolymer (styrene: 82% by weight, butylacrylate 18% by weight, Vicat softening point: 62° C., MFR: 5.5 g/10 minutes) and 50% by weight of a styrene-butadiene copolymer (styrene: 77% by weight, butadiene: 23% by weight, Vicat softening point: 82° C., MFR: 6.0 g/10 minutes) was used.

As an adhesive layer, a maleic anhydride addition product of a hydrogen addition product of a styrene-butadiene copolymer (styrene content: 30% by weight, maleic anhydride addition rate: 1.0% by weight, MFR: 4.0 g/10 minutes, specific gravity: 0.92) was used.

These resins were extruded into a heat-shrinkable multilayer resin film having a five-layer structure of outer surface layer (6 μm)/adhesive layer (1 μm)/intermediate layer (31 μm)/adhesive layer (1 μm)/outer surface layer (6 μm) by a co-extrusion process to form a shrink label.

EXAMPLE 24

As an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As an intermediate layer, a mixture prepared by adding 7.5 parts by weight of 2-(2'-hydroxy-3'-t-butyl-5'-methylphenyl)-5-chlorobenzotriazole as an ultraviolet absorber to 100 parts by weight of a styrene-butadiene copolymer (styrene: 78% by weight, butadiene: 22% by weight, Vicat softening point: 72° C., MFR: 5.6 g/10 minutes) was used.

As an adhesive layer, a maleic anhydride addition product of a hydrogen addition product of a styrene-butadiene copolymer (styrene content: 30% by weight, maleic anhydride addition rate: 0.5% by weight, MFR: 4.0 g/10 minutes, specific gravity: 0.91) was used.

These resins were extruded into a heat-shrinkable multilayer resin film having a five-layer structure of outer surface layer (6 μm)/adhesive layer (1 μm)/intermediate layer (31 μm)/adhesive layer (1 μm)/outer surface layer (6 μm) by a co-extrusion process to form a shrink label.

COMPARATIVE EXAMPLE 8

A shrink label was prepared in a similar manner to Example 22 except that 2-(2'-hydroxy-3'-t-butyl-5'-methylphenyl)-5-chlorobenzotriazole as an ultraviolet absorber was not added.

COMPARATIVE EXAMPLE 9

As an outer surface layer, a polystyrene type resin comprising a styrene-butadiene copolymer (styrene: 78% by weight, butadiene: 22% by weight, Vicat softening point: 72° C., MFR: 5.6 g/10 minutes) was used.

As an intermediate layer, a mixture prepared by adding 2.5 parts by weight of 2-(2'-hydroxy-3'-t-butyl-5'-methylphenyl)-5-chlorobenzotriazole as an ultraviolet absorber to 100 parts by weight of a styrene-butadiene copolymer (styrene: 78% by weight, butadiene: 22% by weight, Vicat softening point: 72° C., MFR: 5.6 g/10 minutes) was used.

These resins were extruded into a heat-shrinkable multilayer resin film having a three-layer structure of outer surface layer (7 μm)/intermediate layer (31 μm)/outer surface layer (7 μm) by a co-extrusion process to form a shrink label.

COMPARATIVE EXAMPLE 10

As an outer surface layer, a polystyrene type resin comprising a styrene-butadiene copolymer (styrene: 78% by weight, butadiene: 22% by weight, Vicat softening point: 72° C., MFR: 5.6 g/10 minutes) was used.

As an intermediate layer, a mixture prepared by adding 7.5 parts by weight of 2-(2'-hydroxy-3'-t-butyl-5'-methylphenyl)-5-chlorobenzotriazole as an ultraviolet absorber to 100 parts by weight of a styrene-butadiene copolymer (styrene: 78% by weight, butadiene: 22% by weight, Vicat softening point: 72° C., MFR: 5.6 g/10 minutes) was used.

These resins were extruded into a heat-shrinkable multilayer resin film having a three-layer structure of outer surface layer (7 μm)/intermediate layer (31 μm)/outer surface layer (7 μm) by a co-extrusion process to form a shrink label.

COMPARATIVE EXAMPLE 11

As an outer surface layer, a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

As an intermediate layer, a mixture prepared by adding 2.5 parts by weight of 2-(2'-hydroxy-3'-t-butyl-5'-methylphenyl)-5-chlorobenzotriazole as an ultraviolet absorber to 100 parts by weight of a polyester type resin, which uses terephthalic acid as a dicarboxylic acid component and contains 67% by mole of a component derived from ethylene glycol and 33% by mole of a component derived from 1,4-cyclohexanedimethanol as a diol component, was used.

These resins were extruded into a heat-shrinkable multilayer resin film having a three-layer structure of outer surface layer (7 μm)/intermediate layer (31 μm)/outer surface layer (7 μm) by a co-extrusion process to form a shrink label.

(Evaluation)

The shrink labels produced in Examples 22 to 24 and Comparative Examples 8 to 11 were evaluated according to the following methods. The results of the evaluation are shown in Table 3.

(1) Ultraviolet Light Transmittance

On the obtained shrink labels, an ultraviolet light (wavelength: 200 to 380 nm) transmittance was measured with a spectrophotometer (Model U-3400, manufactured by Hitachi, Ltd.). A scanning speed was set at 120 nm/min. Incidentally, if the ultraviolet light transmittance is less than 1% at all wavelengths in a range of 200 to 380 nm, it is thought that the shrink label has an adequate ultraviolet light blocking property. Further, a maximum value of the ultraviolet light transmittance at a wavelength of 200 to 380 nm is shown in Table 1.

(2) Presence or Absence of Bleed

After the obtained shrink labels were stored in an atmosphere of 23° C. and 55% in a relative humidity for a week right from film formation, the presence or absence of bleed was verified by wiping the surface of the film with a finger to evaluate it according to the following criteria.

o: There was no substance adhering to the finger.
x: There was a powder substance adhering to the finger.

(3) Contamination of Roll

After the completion of co-extrusion, contamination of a quenching roll of a take-off unit was visually observed to evaluate whether clouding resulting from the bleed of the ultraviolet absorber exists or not.

o: There was no clouding.
x: There was clouding.

(4) Tearing Property Along Perforation

The shrink labels of thirty PET bottles (one which the shrink label can cover without producing delaminations or crinkles) covered with the shrink label were torn off along the perforation with a hand. The conditions in doing so were observed to evaluate the tearing property along perforation according to the following criteria.

o: The shrink labels could be easily torn off along the perforation.
x: Some shrink labels are hard to tear off along the peroration (5) Oil Resistance After an edible oil was applied onto each shrink label of thirty containers covered with the shrink label, the condition of the shrink label was visually observed to evaluate the oil resistance according to the following criteria.

o: There were no crinkles nor breaks in the shrink label.
x: There were crinkles or breaks in the shrink label.

TABLE 3

| | Ultraviolet light transmittance (%) (wavelength at which an ultraviolet light transmittance exhibit a maximum value in a range of 200 to 380 nm) | Presence or absence of bleed | Contamination of roll | Tearing property along perforation | Oil resistance |
|---|---|---|---|---|---|
| Example 22 | 0.3(380 nm) | ○ | ○ | ○ | ○ |
| Example 23 | 0.7(380 nm) | ○ | ○ | ○ | ○ |
| Example 24 | 0 | ○ | ○ | ○ | ○ |
| Comparative Example 8 | 62(380 nm) | ○ | ○ | ○ | ○ |
| Comparative Example 9 | 2.3(280 nm) | ○ | ○ | ○ | x |
| Comparative Example 10 | 0 | x | ○ | ○ | x |
| Comparative Example 11 | 1.3(380 nm) | ○ | x | x | ○ |

INDUSTRIAL APPLICABILITY

In accordance with the present invention, it is possible to provide a shrink label comprising a multilayer film, which is superior in low temperature resistance, heat resistance, oil resistance, tearing properties along the perforation and appearance and does not peel in covering a container, as a base film, and a heat-shrinkable multilayer resin film which can effectively prevent the deterioration of the content of a container due to ultraviolet light and is superior in the tearing properties along the perforation and the oil resistance when the heat-shrinkable multilayer resin film is used as a shrink label for a container, and a shrink label comprising the heat-shrinkable multilayer resin film as a base film.

BRIEF DESCRIPTIONS OF THE DRAWINGS

EXPLANATION OF SYMBOLS

Figure 1:
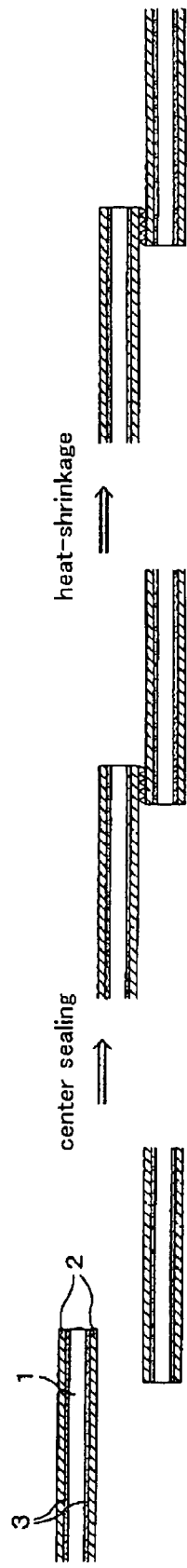
FIG. 1 is a schematic view showing the states of and around a center seal portion in succession of covering steps in employing the shrink label of the present invention.
Figure 2:
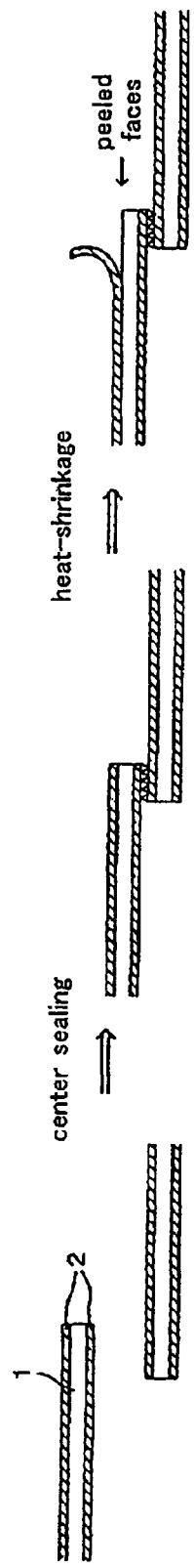
FIG. 2 and FIG. 3 are schematic views showing the states of and around the center seal portion in succession of covering steps in employing conventional shrink labels comprising a multilayer film as a base film.
Figure 3:
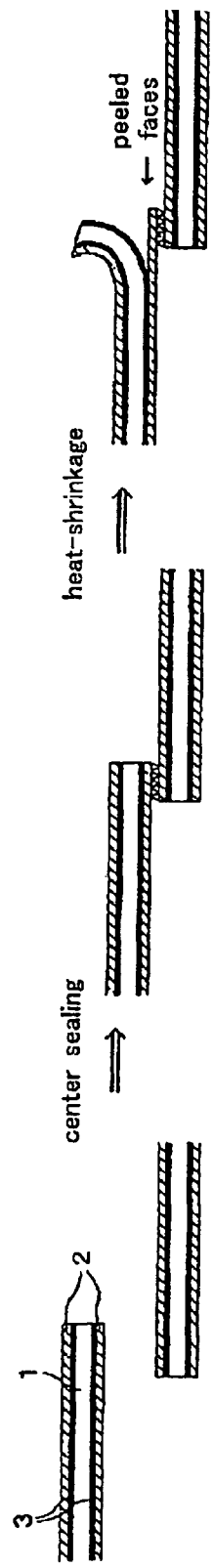

1 intermediate layer
2 outer surface layer
3,3' adhesive layer

The invention claimed is:

1. A shrink label, comprising a heat-shrinkable multilayer resin film comprising an intermediate layer comprising a polystyrene type resin and outer surface layers comprising a polyester type resin, with said intermediate layer interposed therebetween, as a base film,
   wherein the polystyrene type resin composing said intermediate layer is a mixed resin of an aromatic vinyl hydrocarbon-conjugated diene copolymer and an aromatic vinyl hydrocarbon-aliphatic unsaturated carboxylic acid ester copolymer,
   the polyester type resin composing said outer surface layers contains a component derived from terephthalic acid as a dicarboxylic acid component, and a component derived from ethylene glycol and 1, 4-cyclohexanedimethanol as a diol component, and
   said intermediate layer is bonded to said outer surface layers with an adhesive layer consisting of a hydrogen addition product of an aromatic vinyl hydrocarbon-conjugated diene copolymer, having at least one functional group selected from the group consisting of a carboxylic group, an acid anhydride group, an amino group, an epoxy group and a hydroxyl group in a molecule of said hydrogen addition product, and
   the content of aromatic vinyl hydrocarbon components in the hydrogen addition product of an aromatic vinyl hydrocarbon-conjugated diene copolymer is 30 to 80% by weight,
   wherein an amount of the aromatic vinyl hydrocarbon-conjugated diene copolymer to be mixed is 20 to 80% by weight and an amount of the aromatic vinyl hydrocarbon-aliphatic unsaturated carboxylic acid ester copolymer to be mixed is 20 to 80% by weight, in the mixed resin composing the intermediate layer.

2. The shrink label according to claim 1, wherein the hydrogen addition product of an aromatic vinyl hydrocarbon-conjugated diene copolymer composing the adhesive layer, having at least one functional group selected from the group consisting of a carboxylic group, an acid anhydride group, an amino group, an epoxy group and a hydroxyl group in a molecule of said hydrogen addition product, is a maleic anhydride modified styrene-ethylene/butylene-styrene block copolymer, an amine modified styrene-ethylene/butylene-styrene block copolymer, an amine modified styrene-butadiene/butylene-styrene block copolymer or a carboxylic acid modified styrene-butadiene/butylene-styrene block copolymer.

3. The shrink label according to claim 2, wherein the aromatic vinyl hydrocarbon-conjugated diene copolymer composing the intermediate layer is a styrene-butadiene-styrene copolymer and/or a styrene-isoprene-butadiene-styrene copolymer.

* * * * *